United States Patent

[11] 3,590,781

| [72] | Inventor | Thomas H. N. Spencer<br>Ramley House, Pennington, Lymington, England |
|---|---|---|
| [21] | Appl. No. | 817,323 |
| [22] | Filed | Apr. 18, 1969 |
| [45] | Patented | July 6, 1971 |
| [32] | Priority | Apr. 25, 1968 |
| [33] | | Great Britain |
| [31] | | 19,561/68 |

[54] NIPPLE VALVES
8 Claims, 3 Drawing Figs.

| [52] | U.S. Cl. | 119/72.5 |
|---|---|---|
| [51] | Int. Cl. | A01k 7/00 |
| [50] | Field of Search | 119/72.5, 75 |

[56] References Cited
UNITED STATES PATENTS

| 1,165,673 | 12/1915 | Holmes | 119/72.5 UX |
| 2,541,369 | 2/1951 | Kofford | 119/72.5 |
| 3,128,745 | 4/1964 | Alter | 119/75 |
| 3,418,977 | 12/1968 | Godshalk | 119/72.5 |
| 3,481,310 | 12/1969 | Alburger | 119/72.5 |

FOREIGN PATENTS

| 641,507 | 8/1950 | Great Britain | 119/72.5 |

Primary Examiner—Hugh R. Chamblee
Attorney—Kemon, Palmer & Estabrook

ABSTRACT: In a nipple valve for use in drinking water supply systems for birds and of the type operated by a pin which projects out of an outlet of the valve and has a valve head which normally cooperates with a seating in a valve chamber in the valve body to close off the outlet and prevent passage of water out of the valve, the provision of an inlet port at the body by way of which water enters into the chamber and with which the valvehead cooperates when the pin is operated so as to prevent water entering into the chamber while the outlet is open.

PATENTED JUL 6 1971   3,590,781
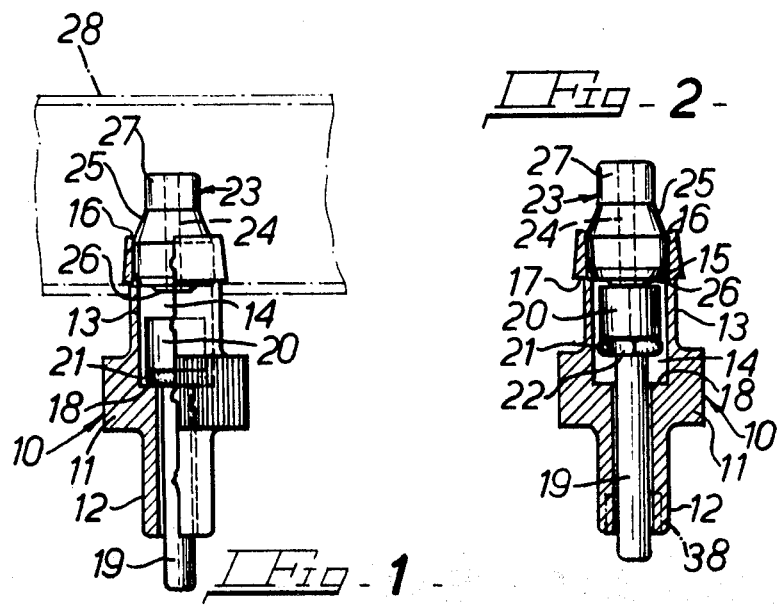
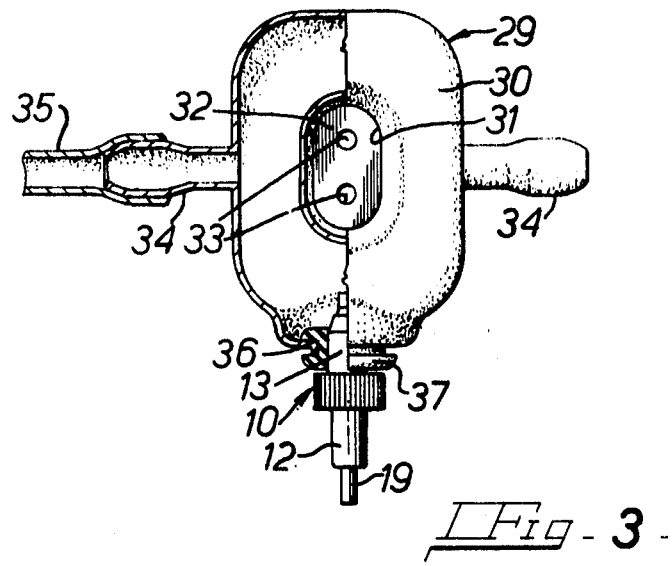

NIPPLE VALVES

This invention relates to nipple valves of the kind used in drinking water supply systems for birds. These valves are used for example in poultry battery cage systems, deep litter houses and chick rearing houses and pens. The valves comprise a body containing a valve chamber into which water entering the valve is received, an outlet leading from the chamber by way of which water leaves the valve, and a valve pin which projects out of the valve outlet and has a valve head which normally cooperates with a seat in the chamber to close off the valve outlet and so prevent passage of water out of the valve. To operate the valve a bird has to push the pin with its beak to move the valve head away from the seat so that the valve outlet is opened and drinking water can pass out of the valve. Such valves are hereinafter referred to as "of the kind described."

Most nipple valves of the kind described which have been available hitherto have suffered from the disadvantage that they release too much water at the moment of operation by a bird unless the valves are supplied with a very low head of water of the order of 3 to 4 inches. This means that where the valves are used in drinking water systems supplying tiered battery cages, for example, a separate header tank has to be provided at each tier to supply the nipple valves. The installation of a separate header tank at each tier, as will be appreciated, is expensive and increases the maintenance work necessary to keep the watering system in order. Furthermore, airlocks frequently occur in the supply lines to the nipple valves because of the very low pressure head, with the result that water does not reach all of the valves. Also there is in any case a sluggish supply of water to those valves at the ends of the supply lines remote from the header tanks.

Attempts have been made to supply valves of the kind described in the tiers of a tiered battery cage system from a single-header tank, but, since it is usual to have the cages arranged in three tiers, the head of water supplied to the valves in the lower tiers is in the order of 6 to 8 feet, and, while there is efficient shutoff of these valves under such heads, when the valves are operated excessive quantities of water are discharged causing wastage of water and, as the excess of water generally finds its way into food troughs serving the cages, sour food.

An object of the present invention is to provide a nipple valve of the kind described which can be operated under the higher heads of water with little, if any, wastage of water.

A further object of the present invention is to provide a nipple valve of the kind described having an inlet port by way of which water enters into the valve chamber and with which the valve head of the pin is arranged to cooperate when the pin is operated to open the valve outlet, so as to prevent, or at least appreciably restrict, entry of water into the valve chamber while the valve outlet is open.

Thus only the water which has accumulated in the valve chamber prior to operation of the pin will be discharged from the valve when the valve outlet is opened. When the pin returns to its normal position in which the valve head closes the valve outlet, the inlet port is opened and the valve chamber is filled with water again ready for the next time that the pin is operated.

By suitable relative dimensioning of the pin and outlet the water may be caused to be released from the valve in the form of droplets when the pin is operated, rather than in a stream.

The action of a bird operating the nipple valve in accordance with the invention is to fit the lower end of the pin into its lower beak and continually work at the pin with an up and down motion until it has released sufficient water from the valve to meet its needs.

It has been found that birds get all the water they require in this way from the valve with a minimum of wastage, even when the valve is operating under a head of water of 6 feet or so.

The inlet port may conveniently be provided in a separate member adapted to be fitted to the inlet end of the conventional form of nipple valve body. The member is fitted as an insert in the inlet end of the body. The insert may be retained in place by being a tight push fit in the inlet end, or it may be retained by a snap action, or in any other convenient manner provided that when the insert is in place it will not move relative to the valve body. It is necessary that the insert should not move relative to the valve body because otherwise the inlet port might not be closed properly if the insert is allowed to move when the valve head is moved into engagement with the inlet port upon operation of the pin. The inlet port may be provided in any other suitable way.

To reduce risk of leakage from the nipple valve when the valve outlet is closed, a sealing ring is preferably fitted in the valve chamber between the valve seating and the valve head of the pin. The ring is conveniently a loose fit in the valve chamber. It may move with the valve head when the pin is operated, or it may remain of the seating.

Nipple valves in accordance with the present invention may be connected in known manner directly to a supply pipe leading from a storage tank, or they may be connected to, or included in the construction of drinkers of any suitable form in, or adapted to be connected to a water supply line.

An embodiment of the invention will now be described by way of example with reference to the accompanying drawings in which:

FIG. 1 is a nipple valve in accordance with the present invention shown partly in section and in its normal closed condition, FIG. 2 is an axial section through the valve in its fully open condition, and FIG. 3 is a view partly in section of the valve connected to a drinker fitting adapted to be connected in a water supply line.

The nipple valve in this embodiment has an injection moulded plastics body 10 of generally known form comprising a hollow cylindrical, externally milled, intermediate portion 11 with a coaxial tubular outlet portion 12 of smaller diameter extending from the lower end of the intermediate portion 11, and a tubular spigot portion 13 extending coaxially from the upper end of the intermediate portion. The upper part of the hollow interior of the intermediate portion 11 and the lower part of the bore of the tubular spigot portion 13 are of similar diameter and the two together form a valve chamber 14. Alternatively the valve chamber may be contained fully within the intermediate portion. The upper part of the bore of the spigot 13 is slightly enlarged so that an upwardly facing annular shoulder 15 is defined where the diameter of the bore changes. At the mouth of the upper end of the bore of the spigot there is a fine internal lip 16. The external diameter of the spigot 13 is less than that of the intermediate portion 11. Near its upper end the external diameter of the spigot 13 is slightly enlarged so that an annular external shoulder 17 is formed facing towards the intermediate portion 11. From this external shoulder 17 the external surface of the spigot 13 tapers towards its upper end.

The lower part of the hollow interior of the intermediate portion 11 forms a continuation of the bore of the outlet portion 12 of the body 10 and is of smaller diameter than the valve chamber 14 so that a shoulder is defined in the bottom of the chamber 14 around the entry to the bore of the outlet portion. This shoulder forms a valve seating 18.

A plastics pin 19 having an integral enlarged diameter valve head 20 is fitted in the body 10 and extends through the bore of the outlet portion 12, the head 20, which is a little smaller in diameter than the chamber 14, being disposed in the chamber. There is a small clearance in the bore of the outlet 12 around the pin 19 sufficient to allow water to seep out of the outlet when the pin is operated. The lower end of the pin 19 depends below the bottom of the outlet 12. An O-ring 21 of rubber, synthetic rubber, or plastics, is fitted on the pin 19 at an enlarged diameter portion 22 of the pin directly underneath the valve head 20. The O-ring 21 is a loose fit in the chamber 14 and seats on the valve seating 18. The O-ring and valve head 20 together act normally to close off the outlet 12.

Into the slightly enlarged diameter upper part of the spigot 13 is fitted, with a snap action, a plastics insert 23 which has a small bore axial passage 24 extending through it. The internal lip 16 at the mouth of the spigot 13 provides the snap action as it engages over the edge of an inclined external shoulder 25 of the insert 23. The resilience of the plastics material of which the body 10 is made allows some distortion of the spigot 13 as the insert 23 is pushed into the bore of the spigot until the lip 16 snaps over the edge of the inclined shoulder 25 of the insert. To assist insertion of the insert into the spigot the lower peripheral edge of the insert is very slightly bevelled. The lip 16 snaps over the edge of the inclined shoulder 25 of the insert as the bottom of the insert abuts against the internal shoulder 15 in the bore of the spigot. The internal shoulder 15 prevents the insert being pushed into the spigot further than is required and ensures that the insert is correctly positioned in the spigot. Any other suitable stop instead of the shoulder 15, may be provided to limit the extend by which the insert 23 may be inserted into the spigot.

If desired the snap-action may be provided by a peripheral lip, rib or other projection on the insert which snaps into engagement with a complementary groove or other recess in the internal surface of the spigot.

An annular bead 26 is formed on the insert 23 where the axial passage 24 opens through the bottom face of the insert. The axial passage 24 forms an inlet port of the valve. The inclined shoulder 25 and a short, reduced diameter, cylindrical upper end portion 27 of the insert 23 project from the spigot 13.

The valve may be fitted, for example, in known manner directly to a supply pipe, as indicated at 28 by broken lines in FIG. 1, leading from a header tank, by pushing the spigot 13 into a hole formed in the wall of the supply pipe 28, the external annular shoulder 17 of the spigot retaining the valve in place after the spigot has been pushed into the hole. A grommet may be fitted around the spigot and engaged in the hole in the wall of the supply pipe to make quite sure that the joint between the valve and pipe is watertight.

The valve may be connected to any other suitable water supply source in a similar way. It may for example be connected to a drinker fitting 29, as shown in FIG. 3, which is adapted to be connected to pipes of a water supply line. This drinker fitting 29 is a hollow, plastics moulding and has a generally bulb-shaped body 30 with a central reentrant portion 31 which extends from the front of the body 30 to a backwall 32 of the body. Holes 33 are provided in the backwall 32 at the reentrant portion 31 for mounting the fitting 29 by screws, nails or bolts on suitable support means at a battery cage. Opening into the interior of the body 30 on opposite sides of the body are aligned connector spigots 34 for connection to flexible plastics, or rubber, pipes 35 of a water supply line from a header tank. In the bottom of the body 30 is a hole 36 into which a rubber grommet 37 is inserted into which in turn the nipple valve is fitted by its spigot 13. The drinker fitting 29 acts as a combined water reservoir and sediment trap.

When the nipple valve is in use, water enters into the valve chamber 14 from the water supply source by way of the inlet port 24 in the insert 23. The small diameter of the inlet port 24 restricts the rate at which water can enter into the chamber 14. Normally the valve outlet 12 is sealed against leakage of water from the chamber 14, as shown in FIG. 1, by the O-ring 21 and valve head 20, so that the chamber is filled with water. The weight of the pin 19 together with the water pressure acting on the valve head 20 maintains the valve head and O-ring in sealing engagement with the valve seating 18. When a bird operates the nipple valve it pushes the pin 19 upwards with its beak, thereby lifting the valve head 20 and O-ring 21 away from the valve seating 18, so that the valve outlet 12 is opened to allow water in the chamber 14 to pass out of the outlet 12 into the bird's beak. The water leaves the valve in the form of droplets. When the pin 19 is fully lifted the top of the valve head 20 engages the bead 26 on the bottom of the insert 23, as shown in Fig. 2, and closes off the inlet port 24, thus preventing entry of water into the chamber 14 from the inlet port while the outlet 12 is open. The engagement of the head with the bead 26 ensures that the inlet port 24 is properly closed off. The extent of the upward movement of the pin from the position in which the valve outlet 12 is closed, to the position in which the valve head 20 closes off the inlet port 24 is quite small so that whenever a bird operates the pin the valve head will almost invariably be moved sufficiently to close off the inlet port while the outlet 12 is open. Thus only the water already accumulated in the valve chamber 14 will pass out of the valve when the pin is operated. Only if the pin were to be pushed upwards very lightly just sufficiently for the O-ring and valve head hardly to leave the seating 18 would the inlet port 24 not be closed off while the outlet 12 is open, but birds are not normally capable of such delicate operation of the pin to achieve this. As soon as the bird allows the pin to fall again to its normal position closing off the outlet 12 the inlet port 24 is opened and the chamber 14 fills with water once more in readiness for the next time that the pin is operated.

The outer, lower, end of the bore of the outlet 12 may be counterbored, as indicated at 38 in Fig. 2 by broken lines, to increase the clearance in the outlet 12 around the lower part of the pin 19. The purpose of this is to avoid the possibility of small particles of food deposited on the pin from a bird's beak becoming lodged in the bore of the outlet around the pin, which might cause the pin to extend at an angle through the outlet instead of coaxially when in its outlet-closing position so that the O-ring does not seat properly on the seating 18 and slight leakage of water from the chamber 14 temporarily occurs. With the provision of the counterbore 38, any food particles deposited when a bird operates the valve stay in the counterbore and do not interfere with the movement of the pin 19, and are washed out of the outlet 12 when the valve is next operated.

I claim:

1. A poultry drinking water nipple valve comprising: a body containing a valve chamber and having an upwardly extending inlet spigot for connecting the valve to water supply means, and having a bore which opens into the top of said valve chamber, and said body also having a downwardly extending tubular outlet portion having an outlet bore with an entry thereto in the bottom of said valve chamber, and a valve seating at the bottom of said valve chamber around said entry;

an insert member engaged in said inlet spigot bore, said insert member at its bottom closing off the top of said valve chamber and having extending therethrough a passage which forms a water inlet port of the valve and opens into said valve chamber through the bottom of said insert member and is of smaller transverse cross section than said inlet bore;

a linearly movable pin which is disposed in said outlet bore and rigid with the top of which is a head which is disposed in said valve chamber and is movable axially therein, has a transverse cross section smaller than that of said valve chamber but larger than the transverse cross section of said outlet bore, normally sealingly cooperates with said valve seating, and which occupies a substantial part of the height of said valve chamber leaving, when said head is cooperating with said valve seating, a small clearance between the top of said head and the bottom of said insert member, and said pin having a transverse cross section sufficiently smaller than that of said outlet bore for there to be a clearance in said outlet bore around said pin along which water can pass from said valve chamber and out of said outlet portion, but said pin transverse cross section being sufficiently large in relation to that of said outlet bore to confine said pin to movement longitudinally of said outlet bore, and said pin being longer than said outlet bore and extending downwards out of said outlet bore by a distance greater than said clearance between the top of said head and the bottom of said insert member, and said pin being movable in said outlet bore between a lower position in which said head sealingly cooperates with said valve seating to prevent passage of water out of said valve chamber and into said outlet bore, and an upper position to which said pin is raised when lifted by a bird's beak and in which said head is spaced above said valve seating to allow water to pass into said outlet bore and hence pass out of said outlet portion by way of said clearance in said outlet bore around said pin, and in which said upper position the top of said head engages the bottom of said insert member and closes off the bottom of said inlet port to prevent entry of water into said valve chamber whilst said pin is in said upper position.

2. A poultry drinking water nipple valve comprising: a body containing a valve chamber and having an upwardly extending inlet spigot for connecting said body to water supply means and having a plain cylindrical bore which opens into the top of said valve chamber, and said body also having a downwardly extending tubular outlet portion having an outlet bore with an entry thereto in the bottom of said valve chamber, and a seating at the bottom of said valve chamber around said entry;

an insert member which has cross-sectional dimensions complementary to said bore of said inlet spigot, is pushed into rigid engagement with said bore, at its bottom closes off the top of said valve chamber, and has extending therethrough a passage forming a water inlet port of the valve which opens into said valve chamber through the bottom of said insert member and is of smaller transverse cross section than said outlet bore; a linearly movable pin which is disposed in said outlet bore and rigid with the top of which is a head which is disposed in said valve chamber and is movable axially therein, has smaller transverse cross-sectional dimensions than said valve chamber but larger transverse cross-sectional dimensions than said outlet bore, normally sealingly cooperates with said valve seating, and which occupies a substantial part of the height of said valve chamber leaving, when said head is cooperating with said valve seating, a small clearance between the top of said head and the bottom of said insert member, and said pin having cross-sectional dimensions sufficiently smaller than those of said outlet bore for there to be a clearance in said outlet bore around said pin along which water can pass from said valve chamber and out of said outlet portion, but said transverse cross-sectional dimensions of said pin being sufficiently large in relation to those of said outlet bore to confine said pin to movement longitudinally of said outlet bore, and said pin being longer than said outlet bore and extending downwards out of said outlet bore by a distance greater than said clearance between the top of said head and the bottom of said insert member, and said pin being movable in said outlet bore between a lower position in which said head sealingly cooperates with said valve seating to prevent passage of water out of said valve chamber and into said outlet bore, and an upper position to which said pin is raised when lifted by a bird's beak and in which said head is spaced above said valve seating to allow water to pass into said outlet bore and hence pass out of said outlet portion by way of said clearance in said outlet bore around said pin, and in which said upper position the top of said head engages the bottom of said insert member and closes off the bottom of said inlet port to prevent entry of water into said valve chamber whilst said pin is in said upper position.

3. A poultry drinking water nipple valve according to claim 2 wherein said inlet spigot has defined within said bore thereof an upwardly facing annular shoulder against which the bottom of said insert member abuts and which limits the extent by which said insert member can be pushed into said bore, and wherein said inlet spigot has in the upper end of said inlet bore thereof an internal lip, and said insert member has at its upper part an inclined external shoulder over which said internal lip engages with snap-action and retains said insert member in said bore.

4. A poultry drinking water nipple valve according to claim 2 wherein said insert member has an annular bead formed on its bottom around said inlet port where said inlet port opens through said bottom with which annular bead the top of said head engages when said pin is in said upper position.

5. A poultry drinking water nipple valve according to claim 2 wherein a sealing O-ring is fitted to said pin immediately underneath said head, said sealing O-ring being movable with said pin and cooperating with said valve seating when said pin is in said lower position to act with said head to prevent passage of water out of said valve chamber.

6. A poultry drinking water nipple valve according to claim 5 wherein said pin has a transversely enlarged portion immediately underneath said head and said sealing O-ring is fitted on said pin at said enlarged portion.

7. A poultry drinking water nipple valve according to claim 2 wherein said outlet bore is counterbored at its outer end remote from said valve seating to increase said clearance in said outlet bore around said pin.

8. A poultry drinking water nipple valve comprising: a body having an upper tubular spigot portion for connecting said body to water supply means, a lower tubular outlet portion coaxial with said spigot portion, and an intermediate portion integral with and between said spigot portion and said outlet portion and transversely larger than said spigot and outlet portions, said spigot portion having a plain cylindrical bore extending axially therethrough, said outlet portion having a bore extending axially therethrough which is of smaller diameter than said spigot portion bore, and said intermediate portion having a hollow interior in two parts, an upper part of which is cylindrical and of similar diameter to said spigot portion bore and opens into the lower end of said spigot portion bore, and a coaxial lower part of said hollow interior also being cylindrical but being of a reduced diameter similar to that of said outlet portion bore of which said bore part forms an upward extension which has an entry in the center of the bottom of said upper part, the bottom of said upper part surrounding said entry defining an annular shoulder which forms an valve seating;

an insert member which is removably pushed into rigid engagement with an upper end part of said spigot portion bore and which insert member has extending therethrough a passage which forms a water inlet port of the valve coaxial with said spigot portion and is of smaller diameter than said outlet portion bore, and said insert member having a bottom face through which said inlet port opens and there being an annular bead formed on said bottom face surrounding said inlet port where said port opens through said bottom face, said spigot portion bore below said insert member and said hollow interior upper part defining together a valve chamber;

a pin disposed in said outlet spigot bore and axially movable therein, said pin having integral with an upper end thereof a cylindrical head coaxial with said pin which head is disposed in said valve chamber and is movable axially therein and which is of larger diameter than said hollow interior upper part, and said pin having fitted thereon immediately underneath said head a sealing ring, of smaller external diameter than said hollow interior upper part, which sealing ring normally engages with said valve seating and in combination with said head closes off said entry to said hollow interior part, and said head and said sealing ring together occupying a substantial part of the height of said valve chamber and leaving, when said sealing ring is in engagement with said valve seating, only a small clearance between the top of said head and said annular bead, and said pin being of a diameter sufficiently less than the diameter of said outlet portion bore for there to be a clearance in said bore around said pin but sufficiently larger in relation to the diameter of said outlet portion to confine said pin to movement axially of said outlet portion, and said pin being longer than the combined lengths of said hollow interior lower part and said outlet portion bore and said pin extending downwards out of said outlet portion by a distance greater than said small clearance between the top of said head and said annular bead, and said pin being movable in said outlet portion between a lower position, in which said sealing ring seats in said valve seating and said sealing ring and said head closes off said entry to said hollow interior lower part to prevent passage of water out of said valve chamber, and an upper position to which said ring is raised when lifted by a bird's beak and in which said sealing ring and said head are spaced above said valve seating to allow water to pass into said hollow interior lower part and hence out of said outlet portion by way of said clearance in said outlet portion bore around said pin, and in which said upper position the top of said head engages the said annular bead and closes off the bottom of said inlet port to prevent entry of water into said valve chamber whilst said pin is in said upper position, thereby allowing only water already in said valve chamber to pass out of the valve.